No. 703,475. Patented July 1, 1902.
E. J. RUSK.
TURTLE TRAP.
(Application filed Oct. 19, 1901.)
(No Model.)
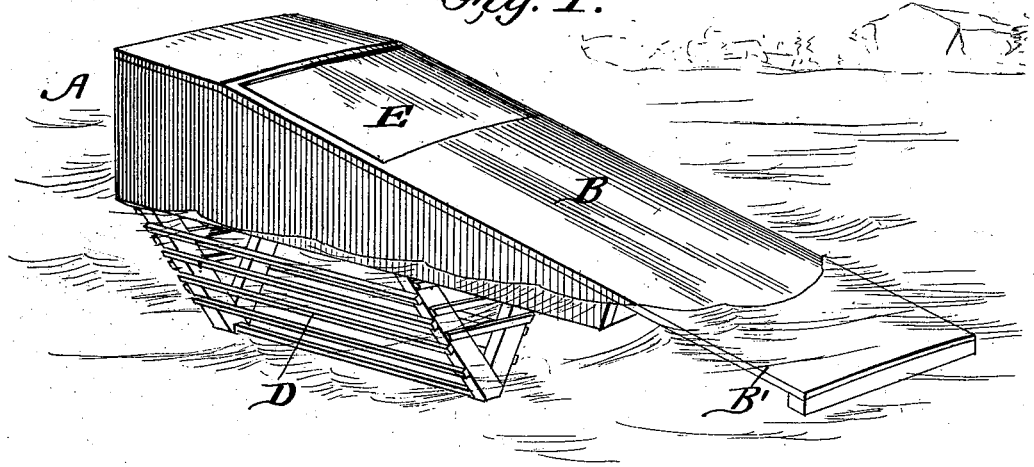
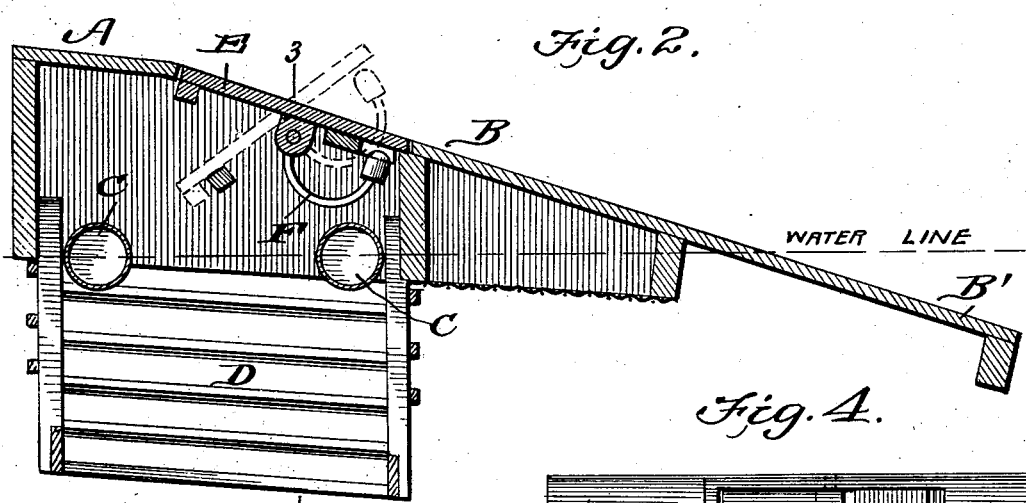
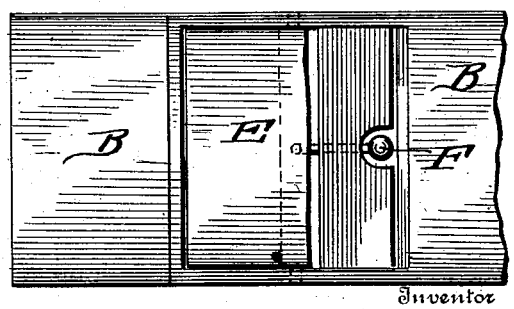
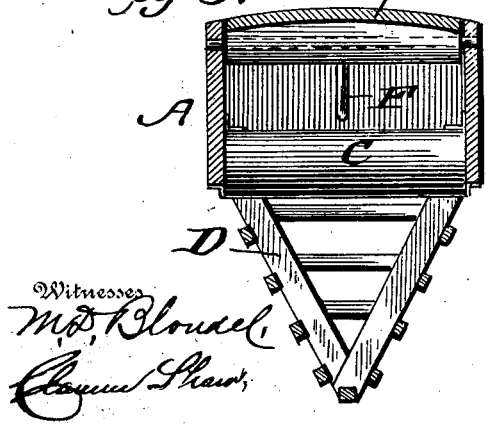
Inventor
E. J. Rusk.
Attorneys

UNITED STATES PATENT OFFICE.

ELAM JEFFERSON RUSK, OF KLEINWOOD, LOUISIANA.

TURTLE-TRAP.

SPECIFICATION forming part of Letters Patent No. 703,475, dated July 1, 1902.

Application filed October 19, 1901. Serial No. 79,247. (No model.)

*To all whom it may concern:*

Be it known that I, ELAM JEFFERSON RUSK, a citizen of the United States, residing at Kleinwood, in the parish of Avoyelles and State of Louisiana, have invented a new and useful Improvement in Turtle-Traps, of which the following is a specification.

This invention is an improved construction of turtle-trap, the object being to provide a simple and efficient construction of trap which can be floated at any desired point for the purpose of entrapping turtles.

With this object in view the invention consists in the peculiar construction of the various parts and their novel combination and arrangement, all of which will be fully described hereinafter and pointed out in the claims.

In the drawings forming a part of this specification, Figure 1 is a perspective view of a turtle-trap constructed in accordance with my invention. Fig. 2 is a vertical sectional view. Fig. 3 is a section on the line 3 3, Fig. 2. Fig. 4 is a sectional plan view.

In carrying out my invention I employ a box or case A, open at the bottom, the top B thereof being made sloping, as indicated, the end B' projecting beyond the main portion of the box. This box is intended to float top uppermost and is provided with two buoyant cylinders C, and beneath the wider end is a cage D, adapted to retain the turtles after being entrapped. The trap-door E is pivotally arranged in an opening produced in the top of the box or case, the pivotal shaft of said trap-door having weighted arm F attached thereto, the purpose of which is to normally hold the trap-door in an elevated position and flush with the top B of the box or case. As before stated, the forward end of the top projects beyond the end of the box and extends below the surface of the water. When the trap is completed and floating, the main portion of the box or case rests upon the water and provides a suitable landing-place for the turtles. The cage portion being arranged entirely below the surface of the water, the turtle will crawl up the inclined top, and as soon as the trap-door is reached and overbalanced the turtle will be deposited into the case and the trap-door automatically returned to its former position, ready to receive the next turtle.

It will thus be seen that the trap is always set and will continue to operate until the cage becomes overcrowded.

Having thus fully described my invention, what I claim as new, and desire to secure by Letters Patent of the United States, is—

1. In a turtle-trap the combination with a floatable box or case having a sloping top provided with the pivoted trap-door and a cage arranged beneath the said box or case, said sloping top projecting beyond the end of the box or case and adapted to extend below the water-line for the purpose described.

2. A turtle-trap comprising in combination a floatable box or case, the top or cover of which is inclined and provided with a pivoted trap-door, said trap-door having a weighted frame connected thereto adapted to normally hold it in a position flush with the top of the box or case and a cage arranged beneath the box or case and adapted to receive the turtle after falling through the trap-door, substantially as shown and described.

3. A turtle-trap comprising in combination a box or case having an inclined top, the forward end of which projects beyond the end of the box or case, the pivoted trap-door arranged in the inclined top and provided with a weighted arm, the cage arranged beneath the box or case and the buoyant cylinders attached to the box or case at its lower end, substantially as shown and described.

ELAM JEFFERSON RUSK.

Witnesses:
E. A. PLANCHE,
L. P. GREMILLION.